United States Patent
Fuhrman

(10) Patent No.: US 6,550,728 B1
(45) Date of Patent: Apr. 22, 2003

(54) HEIGHT ADJUSTABLE TABLE

(75) Inventor: Peter A. Fuhrman, Breslau (CA)

(73) Assignee: Heidt Products Inc., Waterloo (CA)

( * ) Notice: Subject to any disclaimer, the term of this patent is extended or adjusted under 35 U.S.C. 154(b) by 0 days.

(21) Appl. No.: 10/209,861

(22) Filed: Aug. 2, 2002

(51) Int. Cl.[7] .............................................. F16M 11/26
(52) U.S. Cl. .................... 248/188.5; 108/146
(58) Field of Search .......................... 248/188.5, 125.7, 248/125.8, 125.9, 131, 132, 161; 108/146, 147, 147.19; 403/109.1, 109.5

(56) References Cited

U.S. PATENT DOCUMENTS

| | | |
|---|---|---|
| 475,076 A | 5/1892 | Beal |
| 1,346,586 A | 7/1920 | Barber |
| 2,010,290 A | 8/1935 | Campbell |
| 2,302,237 A | 11/1942 | McFall |
| 2,978,113 A | 4/1961 | Anderson et al. |
| 2,992,026 A | 7/1961 | Farber |
| 3,515,418 A | 6/1970 | Nielsen, Jr. |
| 3,596,946 A | 8/1971 | Burton et al. |
| 3,667,716 A | 6/1972 | Fries |
| 3,724,885 A | 4/1973 | Becker |
| 4,076,437 A | 2/1978 | Mazzolla |
| 4,177,739 A | 12/1979 | Phelps |
| 4,183,689 A | 1/1980 | Wirges et al. |
| 4,259,909 A | 4/1981 | Belina |
| 4,419,026 A | 12/1983 | Leto |
| 4,565,395 A | 1/1986 | Rockwood et al. |
| 5,020,752 A | 6/1991 | Rizzi et al. |
| 5,366,275 A | 11/1994 | Sulzer |
| 5,435,529 A | 7/1995 | Day et al. |
| 5,513,825 A | 5/1996 | Gutgsell |
| 6,056,251 A * | 5/2000 | Knopp et al. ............... 248/161 |
| 6,189,843 B1 | 2/2001 | Pfister |
| 6,378,816 B1 | 4/2002 | Pfister |
| 6,402,102 B1 | 6/2002 | Sendfeld et al. |
| 6,435,112 B1 | 8/2002 | Insalaco |
| 2002/0109052 A1 | 8/2002 | Jeon et al. |

* cited by examiner

Primary Examiner—Ramon O. Ramirez
Assistant Examiner—Kofi Schulterbrandt
(74) Attorney, Agent, or Firm—Riches, McKenzie & Herbert LLP

(57) ABSTRACT

A height adjustable table, preferably with a circular tabletop which includes a vertically telescoping column to support the tabletop and with the column telescoping between extended and retracted positions. A base supports lower end of the column vertically upright. A locking mechanism is provided within the telescoping column adapted to lock the column against telescoping when the tabletop is rotated in one direction relative the base and to unlock the column when rotated in the other direction. When the table is unlocked, a user may adjust the height of the table either by manually lifting alone or assisted by a lifting mechanism to bias the tabletop upwardly and at least partially bear the weight of the tabletop. A stop mechanism is preferably provided to ensure the table is not extended so far as to disengage the tabletop structure. The base of the table is adapted to be engaged by a user's feet to prevent rotation relative to the tabletop when locking or unlocking.

24 Claims, 7 Drawing Sheets

HEIGHT ADJUSTABLE TABLE

SCOPE OF THE INVENTION

The present invention relates to a height adjustable table.

BACKGROUND OF THE INVENTION

Height adjustable tables are known which can be adjusted to different levels for different purposes.

Many known height adjustable tables suffer the disadvantages that they are limited as to the different heights to which they can be positioned and frequently can only assume two or more pre-set heights. Such tables suffer the disadvantage that they cannot have incremental heights as may be desired.

Many known height adjustable tables suffer the disadvantage that they are difficult to adjust to different levels.

SUMMARY OF THE INVENTION

To at least partially overcome these disadvantages of the previous known devices, the present invention provides an improved height adjustable table that can be easily adjusted to assume different heights.

It is an object of the present invention to provide a height adjustable table that can be adjusted to any desired height to suit different individuals or for different purposes.

It is another object of the present invention to provide a height adjustable table that is simple in construction and easy to adjust.

The present invention provides a height adjustable table, preferably with a circular tabletop which includes a vertically telescoping column to support the tabletop and with the column telescoping between extended and retracted positions. A base supports lower end of the column vertically upright. A locking mechanism is provided within the telescoping column adapted to lock the column against telescoping when the tabletop is rotated in one direction relative the base and to unlock the column when rotated in the other direction. When the table is unlocked, a user may adjust the height of the table either by manually lifting alone or assisted by a lifting mechanism to bias the tabletop upwardly and at least partially bear the weight of the tabletop. A stop mechanism is preferably provided to ensure the table is not extended so far as to disengage the tabletop structure. The base of the table is adapted to be engaged by a user's feet to prevent rotation relative to the tabletop when locking or unlocking.

According to one aspect of the invention, there is provided a height adjustable table comprising:
- a vertically telescoping column to support a tabletop having an upper end and a lower end and a longitudinal axis, the column telescoping between an extended position and a retracted position,
- the column being attached to the tabletop at its upper end,
- a base receiving the lower end of the column and supporting the column generally vertically upright,
- a locking mechanism within the telescoping column adapted to lock the column against telescoping when the tabletop is rotated in a first direction relative the base and adapted to unlock the column for telescoping extension or retraction when the tabletop is rotated relative to the base in a second direction opposite to the first direction.

BRIEF DESCRIPTION OF THE DRAWINGS

Further aspects and advantages of the present invention will become apparent from the following description taken together with the accompanying drawings in which.

DETAILED DESCRIPTION OF THE INVENTION

Figure 1:
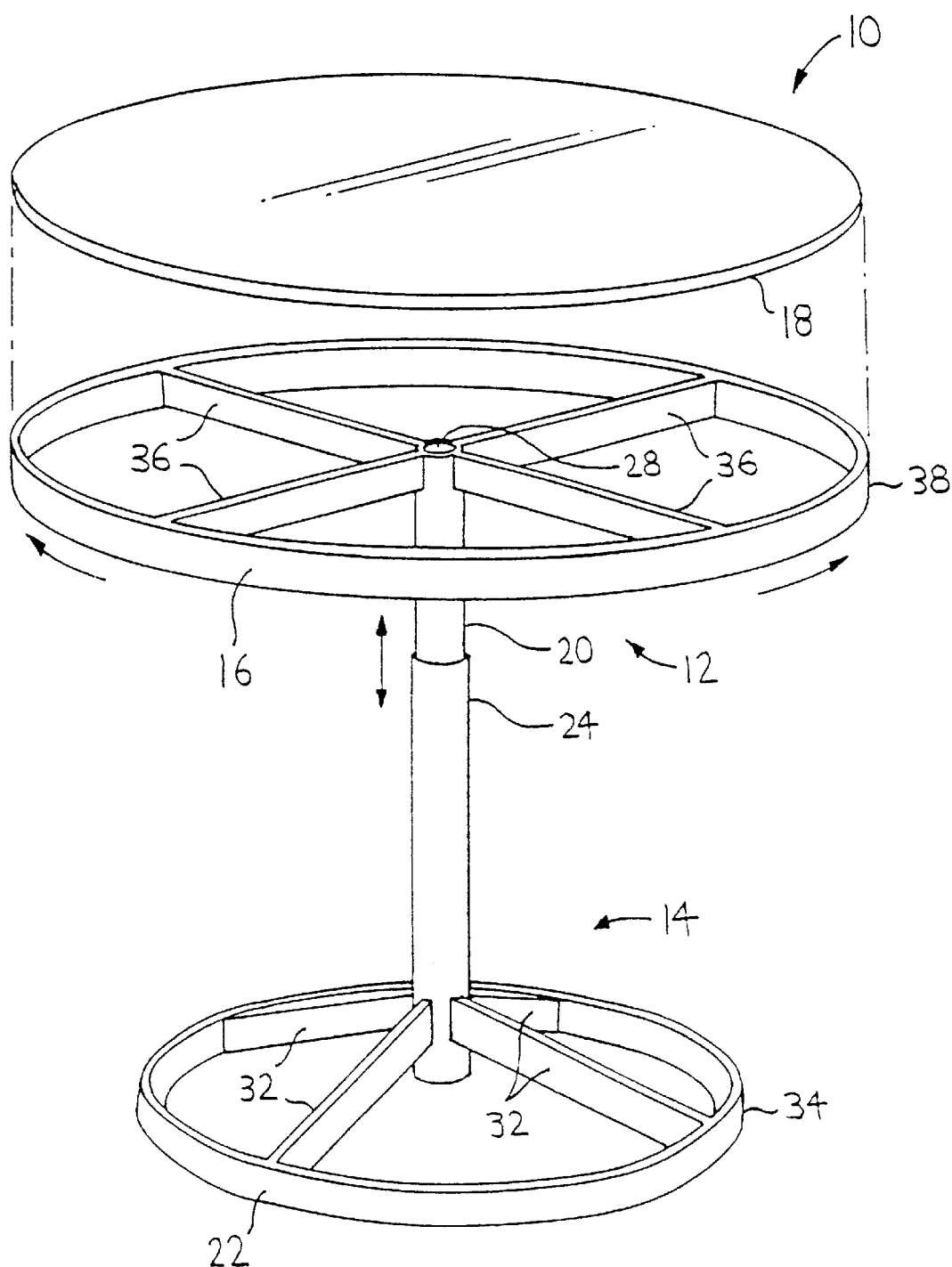
FIG. 1 is a perspective view of a height adjustable table in accordance with a first embodiment of the present invention.
Figure 2:
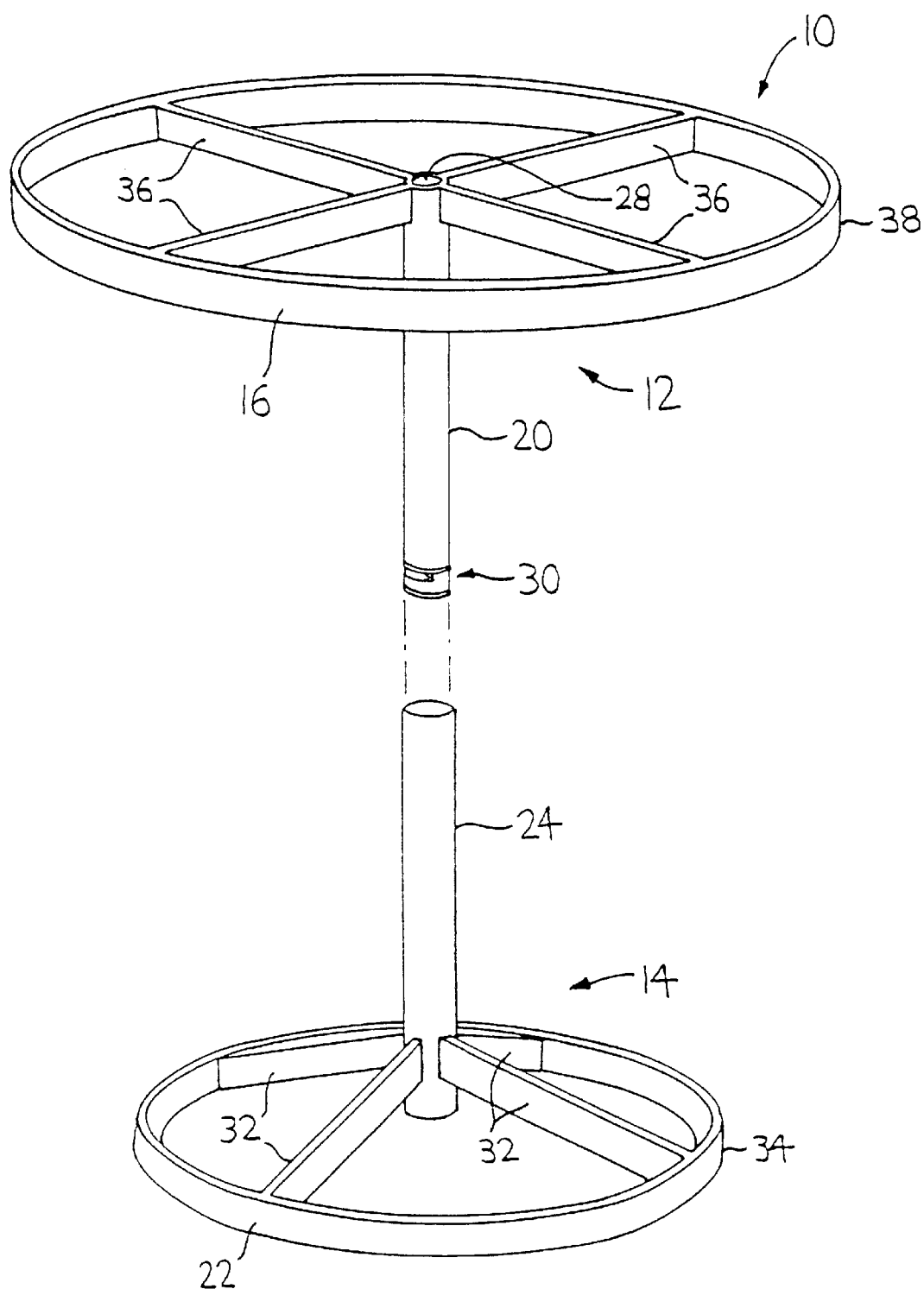
FIG. 2 is a perspective view of the height adjustable table of FIG. 1 with a top structure being detached from a base structure showing the position of a locking mechanism.

Referring now in more detail to the drawings, in which like reference numerals represent like parts throughout the several views, FIGS. 1 and 2 show a height adjustable table in accordance with a first embodiment of the present invention. The height adjustable table, generally designated by reference numeral 10, comprises a top structure 12 and a base structure 14 with a locking mechanism 30 carried on the top structure 12.

The top structure 12 comprises a support 16 for a tabletop 18 and an upper tubular member 20. The upper tubular member 20 is fixedly attached to the tabletop support 16. The base structure 14 comprises a base 22 and a lower tubular member 24. The lower tubular member 24 is fixedly attached to the base 22. The upper tubular member 20 is telescopically slidable within the lower tubular member 24 and together form a vertically telescoping column.

The height of the table 10 can be adjusted to any level between a retracted position and an extended position. Adjustment is achieved by turning the top structure 12 clockwise or counter-clockwise relative the base structure 14, clockwise in order to lock and counterclockwise in order to unlock the upper and lower tubular members 20, 24 and by sliding the top structure 12 vertically relative the base structure 14 in order to raise or lower the top structure 12 relative the base structure 14 when the upper and lower tubular members 20, 24 are unlocked.

FIG. 2 shows the locking mechanism 30 secured at the lower end of the upper tubular member 20. The locking mechanism 30 is adapted to lock the upper and lower telescoping tubular members 20, 24 together at any desired position between an extended position and a retracted position.

Figure 3:
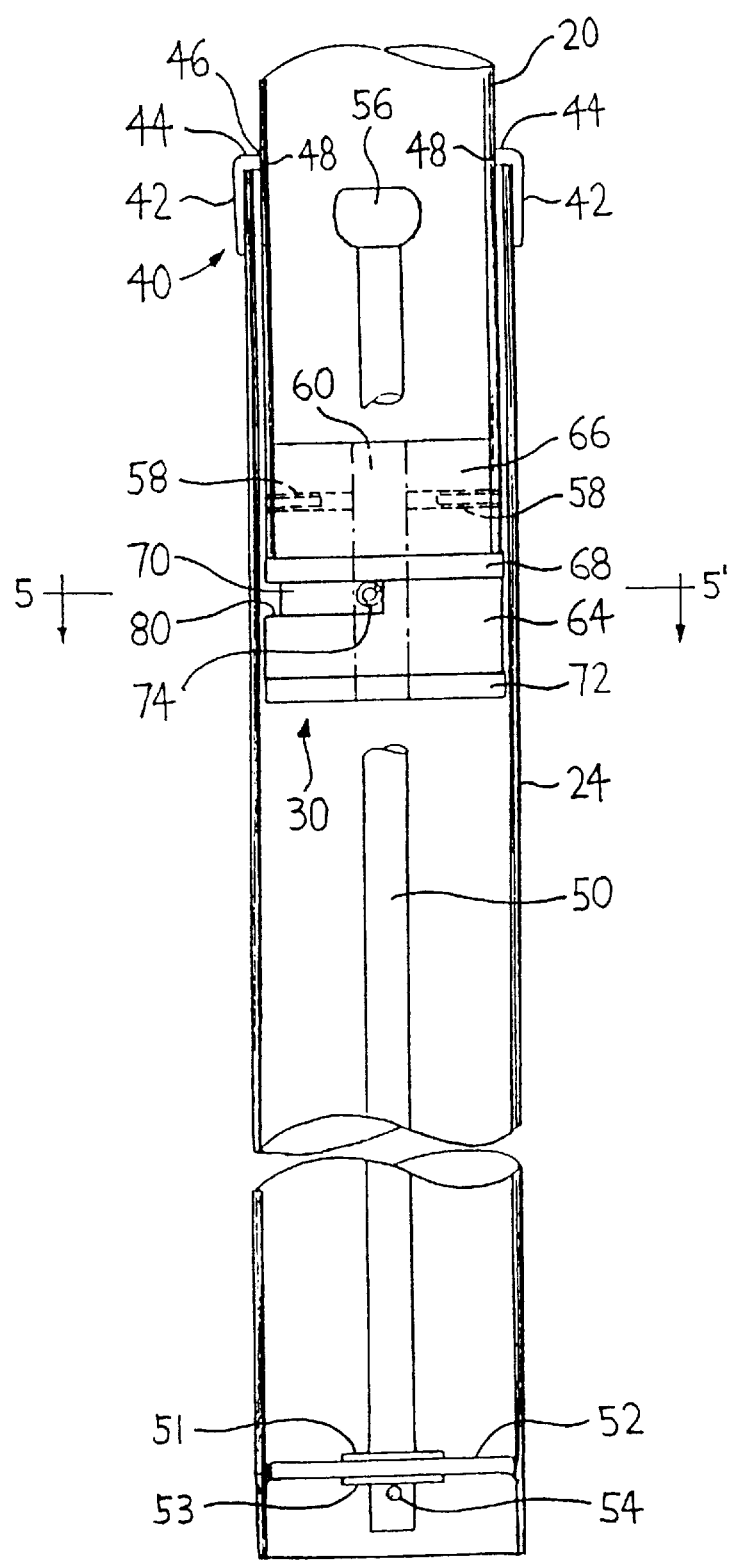
FIG. 3 is a partial cutaway longitudinal cross section of a pair of telescopic columns of the height adjustable table of FIG. 1.

FIG. 3 is a partially cutaway longitudinal cross sectional view of the embodiment of FIG. 1 showing the upper and lower tubular members 20, 24 and the locking mechanism 30.

Each of the upper and lower tubular members 20, 24 is in the form of a cylindrical tube about their respective axis with each having a circular cross section along its length. The outer diameter of the upper tubular member 20 is slightly less than the inner diameter of the lower tubular member 24 so that the upper tubular member 20 is telescopically received in and axially slidably moveable relative the lower tubular member 24 in a vertical direction.

The locking of the upper and lower tubular members 20, 24 together is achieved by the locking mechanism 30 which is now described in detail with reference to FIGS. 3 to 6.

Figure 4:
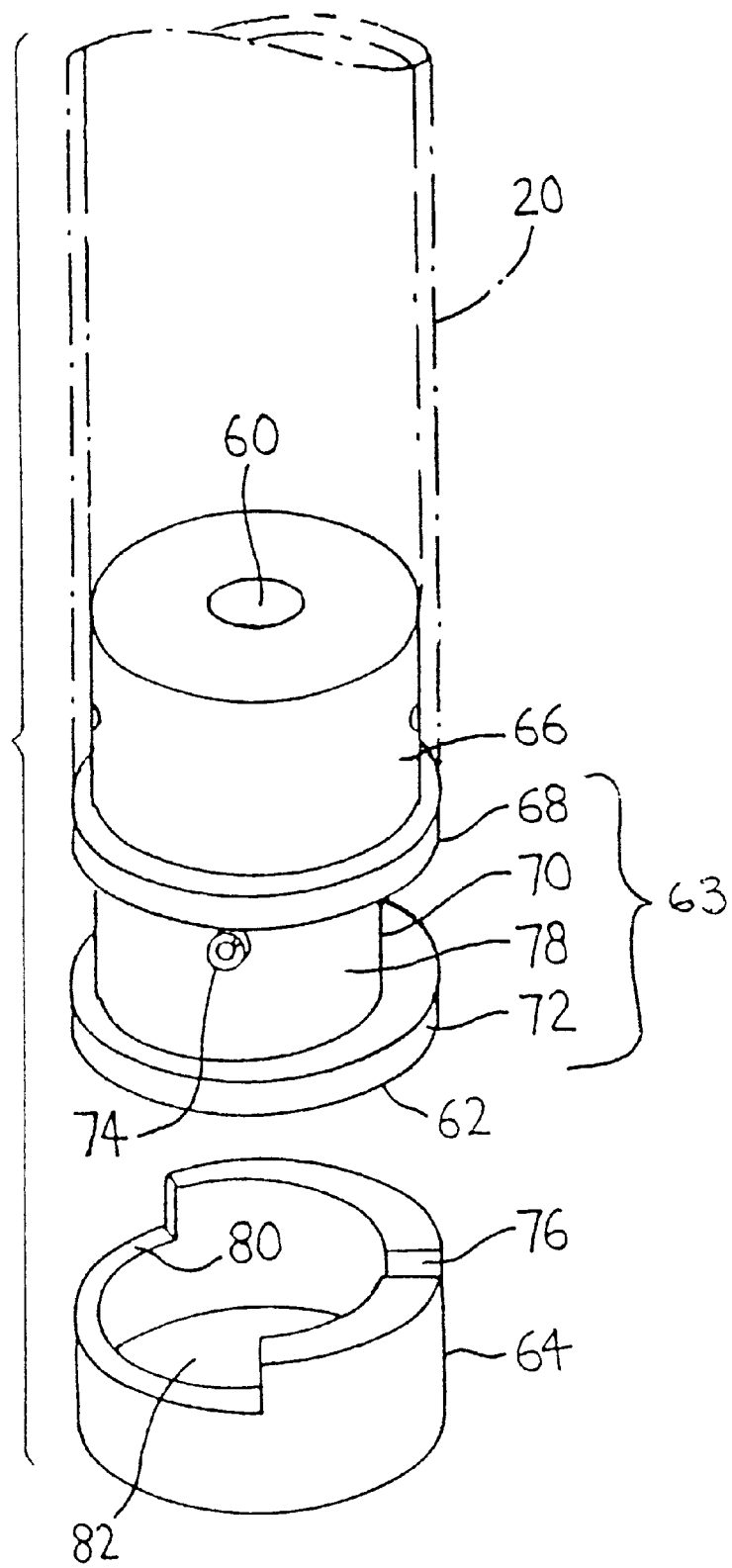
FIG. 4 is an exploded view of a locking mechanism in accordance with a preferred embodiment of FIG. 1.

As best seen in FIG. 4, the locking mechanism 30 comprises a cam bushing 62 and an eccentric collar or split locking ring 64. The cam bushing 62 includes a cylindrical stub 66 and a projecting plug 63 comprising an upper annular flange 68, an eccentric post 70, and a lower annular flange 72.

The cylindrical stub 66 is coaxially secured inside the lower end of the upper tubular member 20 with the end of the upper tubular member 20 abutted against the axially upper surface of the upper annular flange 68. As seen in FIG. 3, at least one fastening pin 58 is used to fasten the stub 66 within the lower end of the upper tubular member 20. Two fastening pins 58 are shown in the present embodiment shown in FIG. 3 each in a radially outer segment of a bore through the stub 66.

The upper annular flange 68, the eccentric post 70 and the lower annular flange 72 together define the plug 63 as a spool-shaped member having an eccentric groove to receiving the locking ring 64.

The upper and lower flanges 68, 72 and the stub 66 are each circular in cross-section and coaxial to each other each being disposed about common axis 67. They are each coaxially disposed relative the upper tubular member 20. The upper and lower annular flanges 68, 72 each presents outwardly facing bearing surfaces facing the inner surface of the lower tubular member 24.

Figure 5:
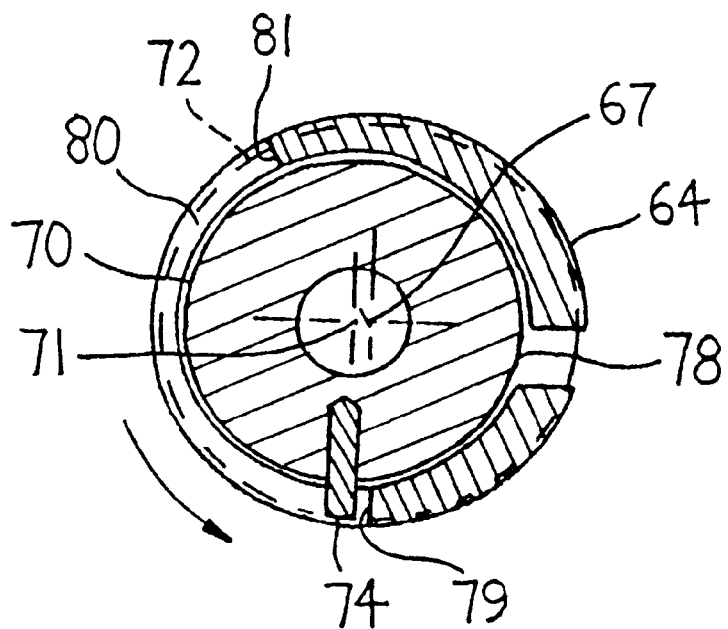
FIG. 5 is a cross sectional view of the locking mechanism of FIG. 3 along section line 5—5' in FIG. 3 however showing the locking mechanism in an unlocked position and without showing the lower column.
Figure 6:
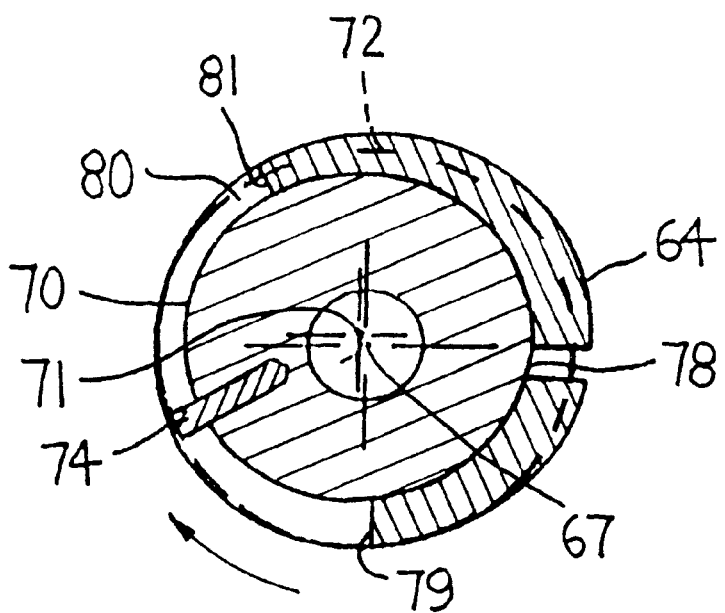
FIG. 6 is a cross sectional view of the locking mechanism which is the same as that of FIG. 5 but showing the locking mechanism in a locked position.

The eccentric post 70 defines a radially outwardly directed eccentric bearing surface 78. The eccentric post 70 is cylindrical but about an axis 71 disposed parallel to the axis 67 of the flanges and stub 66 but offset radially from this axis 67, as best seen in FIGS. 5 and 6. A pin 74 extends radially and outwardly from the eccentric post 70.

The split locking ring 64 is in the form of a C-shape with a slot 76 totally through a circumferential sector of the ring allowing the locking ring 64 to flex to expand or contract radially. The locking ring 64 has an outer surface which when unbiased is generally cylindrical about a first axis. A cylindrical opening 82 extends through the locking ring which is disposed about a second axis parallel to the first axis but displaced from the first axis such that the opening 82 is eccentric relative the outer surface of the locking ring and, for example, as seen in FIG. 4, the locking ring has a radial width which is smallest on the left hand side and greatest on the right hand side near the slot 76. The eccentric opening 82 is of a diameter marginally greater than that of the eccentric post 70 and is adapted to fit around the eccentric post 70.

The locking ring 64 has a circumferentially extending slot or cutout portion 80 opposite the slot 76. The locking ring 64 is engaged journalled around the eccentric post 70 between the upper and lower flanges 68, 72 with the pin 74 positioned in the cutout portion 80. The cutout portion 80 has a circumferential extent from a first end 79 to a second end 81. The cutout portion 80 interacts with the pin 74 so as to limit the rotational positions which the locking ring 64 may assume relative the cam bushing 62 to being between the two positions shown in FIGS. 5 and 6. FIG. 5 illustrates a fully unlocked configuration in which the pin 74 is in engagement with the first end 79 of the cutout portion 80 and the cam bushing is rotated relatively as far as possible counterclockwise relative the locking ring 64. FIG. 6 illustrates a fully locked configuration in which the pin 74 is in engagement with the second end 81 of the cut out portion 80 and the cam busing is rotated relatively as far as possible clockwise relative the locking ring 64.

As seen in FIG. 6 in the fully locked configuration, the outer surface of the locking ring extends radially beyond the upper and lower flanges 68 and 72 of the cam bushing 62 to an extent such that the locking ring if inside the lower tubular member 24, which is not shown in FIGS. 5 and 6, would be urged radially outwardly into frictional engagement with the inside surface of the lower tubular member 24 to lock the upper and lower columns against relative sliding. The lower tubular member 24 is not shown in FIGS. 5 and 6 to assist illustration and teaching of the relative positioning of the locking ring 64 with relative rotation of the cam bushing.

In contrast to FIG. 6, as seen in FIG. 5 in the fully unlocked configuration, the outer surface of the locking ring 64 effectively does not extend sufficiently radially beyond the upper and lower flanges 68 and 72 of the cam bushing to prevent relative sliding of the upper and lower tubular members. In FIG. 5, the locking ring 64 is shown to extend marginally outwardly of the upper flange 68, however with sufficient space radially inwardly of the locking ring 64 between the locking ring 64 and the eccentric post 70 that due to the inherent resiliency of the locking ring 64, the locking ring will engage the inner surface of the lower tubular member 24 but only with forces generated due to the inherent bias of the locking ring 64 to assume an expanded unbiased condition.

FIGS. 5 and 6 show the fully unlocked and fully locked positions. For locking it is not necessary that the cam bushing be rotated to the fully locked position. Locking may be accomplished by rotation of the cam bushing clockwise towards the fully locked position to an extent that the locking ring is expanded radially outwardly to accomplish locking. Similarly, for unlocking it is not necessary that the cam bushing be rotated to the fully unlocked position. Unlocking may be accomplished by rotation of the cam bushing counter-clockwise towards the fully unlocked position to an extent that the locking ring is not urged by the eccentric post 70 outwardly into the inner surface of the lower tubular member 24 sufficiently to lock the upper and lower tubular members against relative sliding.

To adjust the height of the table 10 of the present invention, a user preferably first steps on the base 22 with one foot. The base 22 defines stepping surfaces for the user to step on so that the user can with his foot hold the base 22 firmly to the ground and prevent the base from rotating and/or being lifted up during table height adjustment. In the present embodiment shown in FIG. 1, the base 22 comprises a plurality of radially outwardly extending spoke-like legs 32 and an annular base portion 34. The inner end of each of the legs 32 is connected to a lower portion of the lower tubular member 24. The outer end of each of the legs 32 is connected to the annular base portion 34.

With the base 22 firmly held to the ground, or at least against rotation, the user then grasps the tabletop support 16 with his hands. The tabletop support 16 defines gripping surfaces for the user to hold onto during table height adjustment. In the present embodiment shown in FIG. 1, the tabletop support 16 comprises a plurality of radially outwardly extending spoke-like arms 36 and an annular top portion 38.

The user rotates the tabletop support 16 counter-clockwise relative to the base 22 which moves cam bushing 62 and its locking pin 74 counter-clockwise relative the locking ring 64 sufficiently towards the fully unlocked position as seen in FIG. 5 to adopt an unlocked configuration.

In an unlocked position, a user may either pull up or push down the tabletop support 16 so as to vertically adjust the height of the table 10 by adjusting the extent to which the lower and upper tubular members are telescoped.

After the tabletop support is positioned at a desired height, the user then turns the tabletop support 16 clockwise relative the base 22 which moves the cam bushing 62 and its locking pin clockwise relative the locking ring 64 toward the fully locked position as seen in FIG. 6 to adopt a locked configuration with the outer surface of the locking ring urged out beyond the upper and lower annular flanges 68, 72 and into friction engagement with the inner wall of the lower tubular member 24, thereby frictionally engaging and locking the upper and lower tubular members 20, 24 in a locked position.

A cover 40 is provided at an upper end of the lower tubular member 24. The cover 40, preferably made of plastic, is fixedly attached to the upper end of the lower tubular member 24. The cover 40 includes a cylindrical sleeve 42 covering the outer wall of the lower tubular member 24 and a radially and inwardly extending annular flange 44 covering and extending inwardly from the top annular edge of the lower tubular member 24. The annular flange 44 defines a circular opening 46 through which the upper tubular member 20 passes.

The opening 46 has an inwardly facing annular bearing surface 48 which slidably engages the outer wall of the upper tubular member 20. The annular bearing surface 48 assists in centering and guiding the upper tubular member 20 as it slides within the lower tubular member 24, as for example to help prevent the upper tubular member 20 from tilting so as to maintain the tabletop 18 horizontal.

The cover 40 also assists in preventing water and other foreign substances, such as water, dust and insects, from entering and contaminating the space between the upper tubular member 20 and the lower tubular member 24 and which may be disadvantageous to smooth telescopic movement of the upper and lower tubular members 20, 24.

A circular mounting plate 52 is secured to the inner wall of the lower tubular member 24. An elongated stop rod 50 is secured to the lower tubular member 24 with a lower end of the stop rod 50 detachably mounted to the mounting plate 52. The stop rod 50 extends substantially along the length of the lower tubular member 24 along the central axis thereof. The stop rod 50 extends via an elongated central bore 60 through the locking mechanism 30. The lower end of the stop rod 50 has an upper washer 51 fixedly secured to the rod 50 which engages the upper surface of the mounting plate 52 and limits downward movement of the stop rod 50 in the mounting plate 52.

A detachable locking pin 54 is adapted to be inserted transversely through an aperture in the stop rod 50 below the mounting plate 52 for limiting, with assistance of a removable lower washer 53, the upward movement of the stop rod 50 relative to the lower tubular member 24 by reason of the lower washer 53 and locking pin 54 engaging the lower surface of the mounting plate. When the locking pin 54 is not installed, the stop rod 50 can be inserted and removed from the lower tubular member 24 and upper tubular member 20 through an upper open end 28 of the upper tubular member 20 of the top structure 12.

The upper end of the stop rod 50 is provided with an enlarged head 56 which is too large to pass through the central bore 60 of the cam bushing 62 such that the enlarged head limits upward movement of the upper tubular member 20 beyond the extended position. The enlarged head 56 effectively provides a stop shoulder directed toward the lower end of the rod 50. The cam bushing 62 is fixed to the upper tubular member 20 and effectively provides a stop member with stop surfaces to engage the stop shoulders on the enlarged head 56 and prevent extension beyond the fully extended position.

The upper tubular member 20 is adapted to slide vertically downwards in the lower tubular member 24 to a fully retracted position where the locking mechanism 30 engages the mounting plate 52 and the tabletop 18 is at its lowest height. The upper tubular member 20 is adapted to slide vertically upwards in the lower tubular member 24 to a fully extended position where the locking mechanism 30 engages the enlarged head 56 of the stop rod 50 and the tabletop 18 is at its highest height.

The embodiment of FIG. 1 can be assembled by securing the locking mechanism 30 to the upper tubular member 20, sliding the upper tubular member 20 into the lower tubular member 24 and then sliding the stop rod 50 down through the open upper end 28 of the upper tubular member 20, through the central bore 60 in the locking mechanism 30, and through the mounting plate 52. Next the lower washer 53 and locking pin 54 are applied to the lower end of the stop rod 50 from the open lower end of the lower tubular member 24.

In the embodiment of FIG. 1, the stop rod 50 is secured to the upper tubular member 20, it is to be appreciated that the stop rod 50 could be secured to the lower tubular member 24 to engage a stop member secured to the upper tubular member. Other extension stop mechanisms may be provided.

Figure 7:
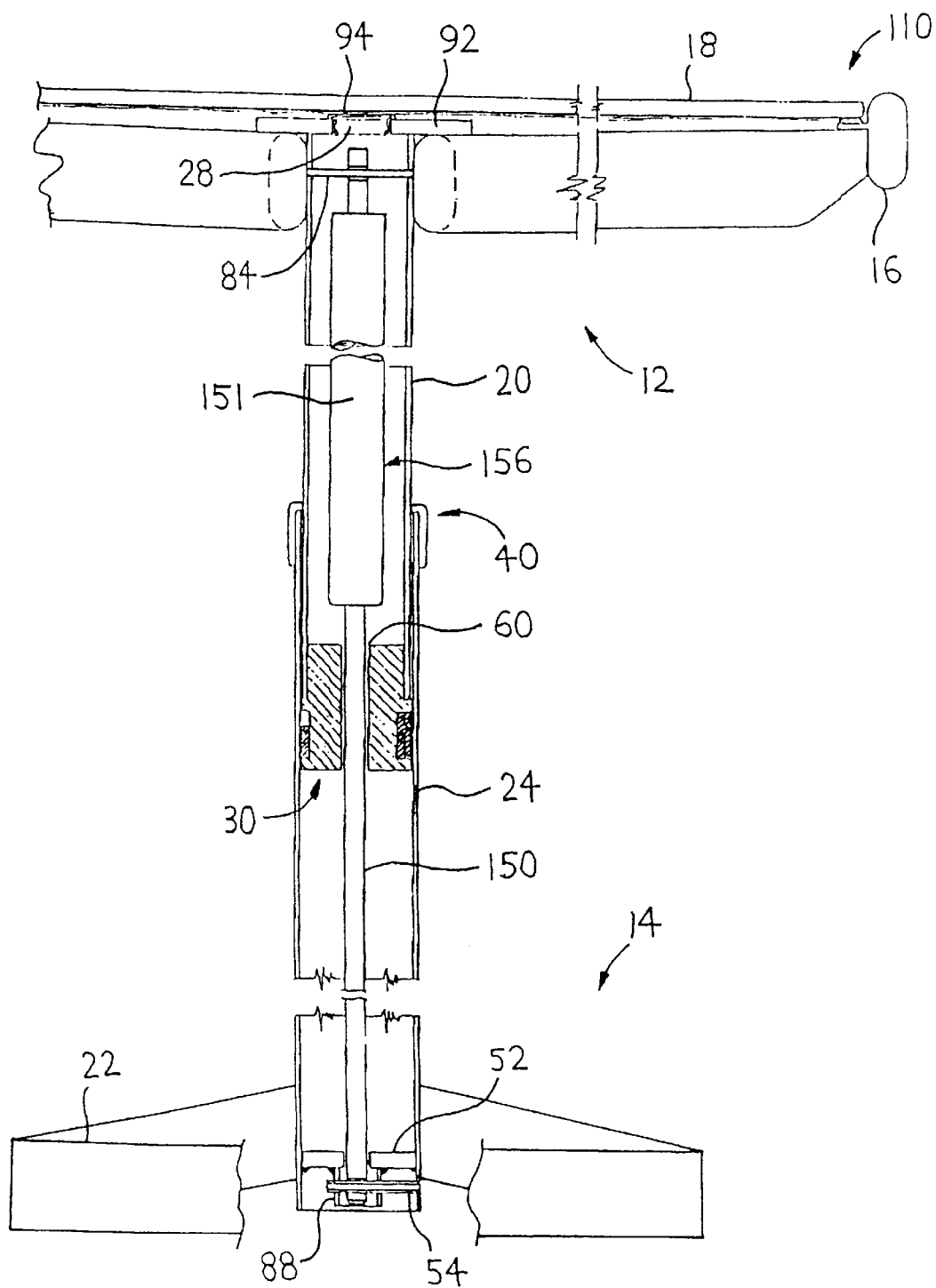
FIG. 7 is a partial cutaway longitudinal cross section of a height adjustable table in accordance with a second embodiment of the present invention.

FIG. 7 is a longitudinal cross section of a height adjustable table in accordance with a second embodiment of the present invention. The height adjustable table, generally represented by reference numeral 110, is substantially identical in structure to the height adjustable table 10 of the first embodiment, with the notable exception that the stop rod 50 is replaced by a pressurized gas spring 156.

The gas spring 156 is mounted coaxially within upper and lower tubular members 20, 24 and biases the telescoping upper and lower tubular members 20, 24 away from each other towards the extended position.

The gas spring 156 is of known construction and includes a piston rod 150 which is telescopically received within a gas cylindrical housing cylinder 151 such that gas pressure within the cylinder 151 biases the piston rod 150 outwardly from the gas spring 156. The gas spring 156 is mounted within the upper tubular member 20 above the locking mechanism 30.

The piston rod 150 passes through the central bore 60 of the locking mechanism 30.

The upper end of the gas spring 156 is detachably attached to the upper end of the upper tubular member 20 by a removable locking pin 84. The lower end of the piston rod 150 is mounted to the mounting plate 52 by a detachable locking pin 54 adapted to be inserted transversely through an opening in a lower end of the piston rod 150 and openings in the lower tubular member 24 and a mounting tube 88 secured to the mounting plate 52.

When the locking pins 54 and 84 are removed, the gas spring 156 can be removed from the inside of the upper and lower tubular members 20, 24 through the upper opening 28 of the upper tubular member 20. A cover plate 92 is shown attached to the upper end of the upper tubular member 20 below the tabletop 18. A cap 94 is used to cover an opening through the cover plate into the upper end of the upper tubular member 24.

Adjustment of the height of the table of the second embodiment is the same as with the first embodiment however the gas spring 156 provides forces which reduce the forces required to raise the top structure 12.

The relative lifting forces developed by the gas spring 156 is preferably proximate to the weight of the top structure 12 such that a person may raise or lower the unlocked top structure 12 with minimal effort. Preferably the lifting forces will be sufficiently great that on unlocking, the top structure 12 will be pushed by the gas cylinder alone to the fully extended position.

The gas spring 156 is sized such that maximum extension of the piston rod 150, represents a fully extended position of the upper tubular member relative the lower tubular member in which the upper and lower tubular members are telescopically engaged and the locking mechanism 30 is within the lower tubular member. The piston rod 150 is retractable into the cylinder such that preferably the locking mechanism 30 engages the mounting plate 52 in a fully retracted position of the upper tubular member relative the lower tubular member.

Although it has been shown that the elevation of the tabletop in FIG. 7 is facilitated by a pressurized gas cylinder, it is appreciated that elevation of the tabletop can be achieved by other appropriate mechanisms, such as a compressed spring.

Figure 8:
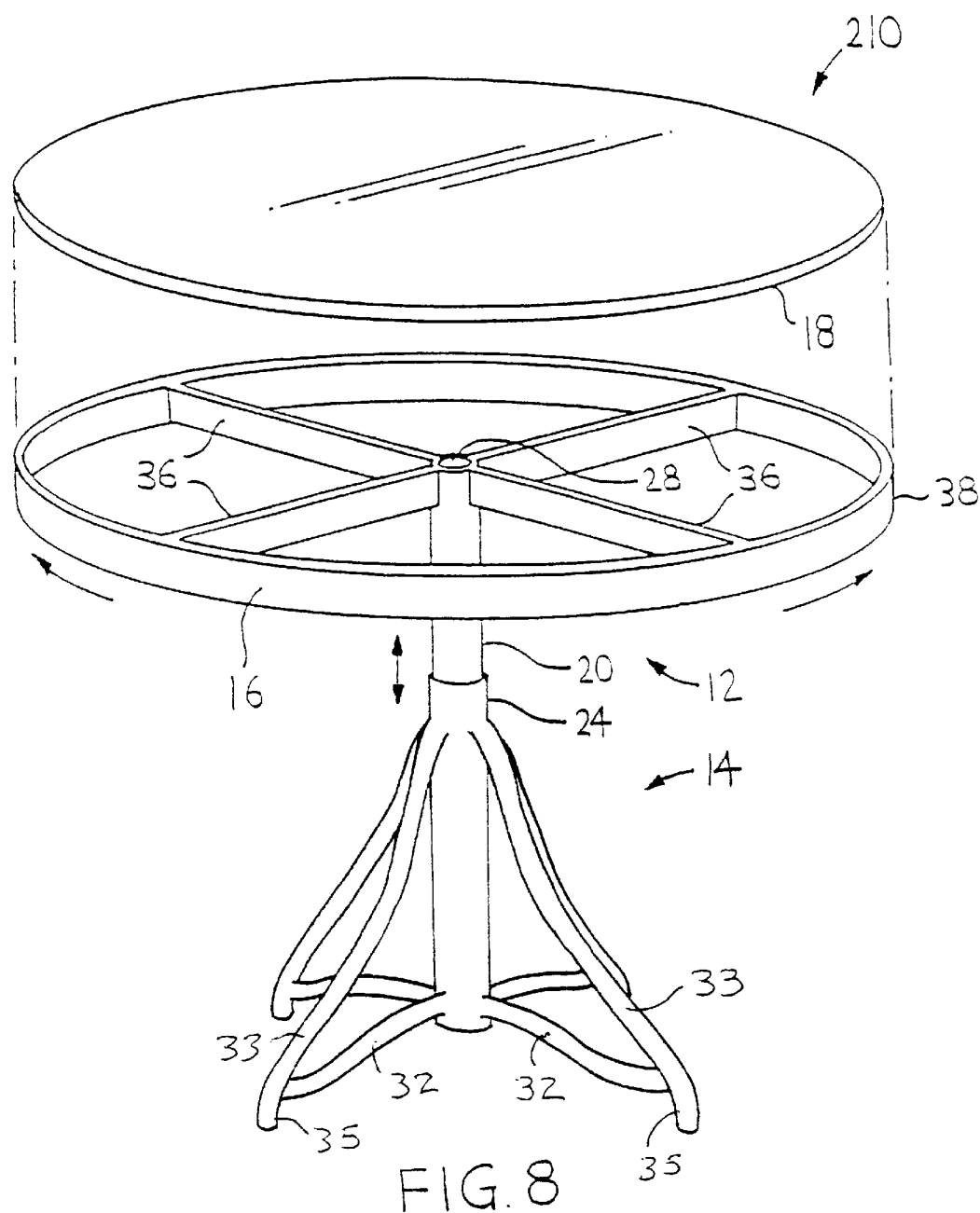
FIG. 8 is a perspective view of a table in accordance with a third embodiment of the present invention.

Reference is made to FIG. 8 which shows a height adjustable table 10 in accordance with a third embodiment which is identical to that shown in FIG. 1 but for the modification of the base structure 14 to have legs comprising lower leg portion 32 and upper leg portion 33. Each upper leg portion 33 extends radially outwardly from near the upper end of the lower tubular member 24 and downwardly from a foot portion 35 engaging the floor. Each lower leg portion 32 extends radially outwardly proximate the lower end of the lower tubular member 24 to join a respective upper leg portion 33 above the foot portion.

The embodiment of FIG. 8 is particularly adapted for use with a gas spring or other lifting device as described with reference to FIG. 7. A user may place his foot on an appropriate side of any foot portion 35 to prevent rotation of the base or could place his foot on top of the upper leg portion 33.

The preferred embodiments show the upper tubular member 20 being received inside the lower tubular member 24. This is not necessary. The columns and the locking mechanism could be inverted with the lower tubular member inside the upper tubular member. Locking is described by rotation clockwise, however, locking could be arranged to be accomplished by counter-clockwise rotation.

The preferred embodiments preferably have a tabletop of glass, plastic, metal or composites thereof. The columns 20 and 24 and their respective support 16, base 22 and spoke-like legs 32 and arms 36 are preferably metal such as aluminum or steel and welded together. The cam bushing 62 is preferably of metal or plastic and may comprise one or more elements. The locking ring 64 preferably comprises plastic or metal.

In the preferred embodiments, the tabletop is circular. This is not necessary and the tabletop may be square, octagonal, triangular, oval and various other shapes, however, it is generally preferred to be somewhat symmetrical about its base.

The preferred embodiments show specific manners of coupling various elements together such as the manner of securing the stop rod 50 to the upper tubular member 20, securing the gas spring 156 to the upper and lower tubular members and securing the cam bushing to the upper tubular member 20.

It is to be appreciated that many different mechanical coupling mechanisms may be used and substituted without departing from the scope of the invention.

While the invention has been described to preferred embodiments, many modifications and variations will now occur to persons skilled in the art. For a definition of the invention, reference is made to the appended claims.

What is claimed is:

1. A height adjustable table comprising:
a vertically telescoping column to support a tabletop having an upper end and a lower end and a longitudinal axis, the column telescoping between an extended position and a retracted position,
the column being attached to the tabletop at its upper end,
a base receiving the lower end of the column and supporting the column generally vertically upright,
a resilient lifting mechanism mounted within the column biasing the column to the extended position and being compressible to permit the column to telescope to the retracted position,
a locking mechanism within the telescoping column adapted to lock the column against telescoping when the tabletop is rotated in a first direction relative the base and adapted to unlock the column for telescoping extension or retraction when the tabletop is rotated relative to the base in a second direction opposite to the first direction.

2. A table as claimed in claim 1 wherein the telescoping column comprises an outer tubular member and an inner tubular member, the inner tubular member slidable within the outer tubular member between the extended position and the retracted position,
one of the inner tubular member and outer tubular member fixed to the tabletop for rotation therewith,
the other of the inner tubular member and outer tubular member coupled to the base for rotation therewith,
the locking mechanism carried on the inner tubular member disposed inside the outer tubular member,
the locking mechanism expanding radially outwardly from the inner tubular member on relative rotation of the inner tubular member relative the outer tubular member in the first direction to frictionally engage interior surfaces of the outer tubular member and lock said inner tubular member to said outer tubular member against movement.

3. A table as claimed in claim 2 wherein the lifting mechanism comprises a gas cylinder including a cylindrical housing and an extendable rod with an outward end of the rod longitudinally movable within the housing and biased to extend longitudinally from the housing,
the housing secured within the inner tubular member coaxially therein with the rod extending from the inner tubular member coaxially into the outer tubular member with the outward end of the rod secured to the outer tubular member.

4. A table as claimed in claim 3 wherein the rod is received in the cylinder such that when the rod is fully extended from the housing, the housing prevents the rod from further extension and the rod and housing thereby prevent further telescopic extension of the inner and outer tubular members in the fully extended position in which the inner tubular member is received within the outer tubular member.

5. A table as claimed in claim 1 wherein the locking mechanism comprises a plug projecting from an inner end of said inner tubular member into the outer tubular member, the plug having an outer periphery with a groove therein which is eccentric relative to an axis of the inner tubular member, an eccentric collar in said groove, the eccentric collar having a substantially completely annular outer cylindrical surface and an eccentric opening therein for receipt of the collar in said groove, the collar being movable within the groove in opposite directions between a concentric position permitting longitudinal sliding of the inner tubular member and outer tubular member and an eccentric position in which said collar is expanded radially outwardly to engage inside surfaces of the outer tubular member for locking the outer tubular member against sliding relative the inner tubular member.

6. A table as claimed in claim 5 including a central aperture through said plug coaxial with the inner tubular member, said extendable rod passing through said central aperture through said plug from the inner tubular member into the outer tubular member.

7. A table as claimed in claim 6 including a circumferentially extending slot in the collar and a projection on said plug received in said slot in said collar for limiting rotation of the collar within said slot in opposite directions between the concentric position and the eccentric position, and wherein the collar is split and is made of flexible material to ensure frictional sliding contact between said collar and the inner surfaces of the outer tubular member.

8. A table as claimed in claim 1 wherein said base provides stepping surfaces for a user to engage with the user's foot so that the user can hold said base against rotation on a user rotating the tabletop.

9. A tabletop as claimed in claim 8 wherein said base comprises a plurality of radially and outwardly extending legs defining said stepping surfaces.

10. A table as claimed in claim 9 wherein said base further comprises an annular base portion connected to an outer end of each of said legs, said annular base portion adapted to be engaged by a user's foot.

11. A table as claimed in claim 8 including a support for the tabletop fixedly coupled to the upper end of the column and supporting the tabletop thereon, the tabletop support providing surfaces for the user to hold onto so that the user can turn said tabletop support relative the base.

12. A table as claimed in claim 11 wherein said tabletop support comprises a plurality of radially and outwardly extending arms and includes an annular top portion connected to an outer end of each of said arm, said annular top portion defining a portion to be grasped by a user's hands for rotation of the table.

13. A table as claimed in claim 1 wherein said tabletop is circular.

14. A height adjustable table comprising:

a vertically telescoping column to support a tabletop having an upper end and a lower end and a longitudinal axis, the column telescoping between an extended position and a retracted position, the column being attached to the tabletop at its upper end, a base receiving the lower end of the column and supporting the column generally vertically upright, a locking mechanism within the telescoping column adapted to lock the column against telescoping when the tabletop is rotated in a first direction relative the base and adapted to unlock the column for telescoping extension or retraction when the tabletop is rotated relative to the base in a second direction opposite to the first direction.

15. A table as claimed in claim 14 wherein the telescoping column comprises an outer tubular member and an inner tubular member, the inner tubular member slidable within the outer tubular member between the extended position and the retracted position, one of the inner tubular member and outer tubular member fixed to the tabletop for rotation therewith, the other of the inner tubular member and outer tubular member coupled to the base for rotation therewith, the locking mechanism carried on the inner tubular member disposed inside the outer tubular member, the locking mechanism expanding radially outwardly from the inner tubular member on relative rotation of the inner tubular member relative the outer tubular member in the first direction to frictionally engage interior surfaces of the outer tubular member and lock said inner tubular member to said outer tubular member against movement.

16. A table as claimed in claim 15 wherein the locking mechanism comprises a plug projecting from an inner end of said inner tubular member into the outer tubular member, the plug having an outer periphery with a groove therein which is eccentric relative to an axis of the inner tubular member, an eccentric collar in said groove, the eccentric collar having a substantially completely annular outer cylindrical surface and an eccentric opening therein for receipt of the collar in said groove, the collar being movable within the groove in opposite directions between a concentric position permitting longitudinal sliding of the inner tubular member and outer tubular member and an eccentric position in which said collar is expanded radially outwardly to engage inside surfaces of the outer tubular member for locking the outer tubular member against sliding relative the inner tubular member.

17. A table as claimed in claim 16 including an elongate stop rod with a first end and a second end, the second end of the rod carrying a stop shoulder directed towards the first end, the first end of the rod secured to one of the inner and outer tubular members to extend coaxially therein into the other of the inner and outer tubular members and past a stop member secured within the other of the inner and outer tubular members, the stop member having stop surfaces directed away from the first end of the rod, the stop surfaces on the stop member adapted to engage the stop shoulders on the second end of the rod to prevent relative extension of the inner and outer tubular members beyond the fully extended position in which the inner tubular member is received within the outer tubular member.

18. A table as claimed in claim 17 including a central aperture through said plug coaxial with the inner tubular member, said stop rod passing through said central aperture through said plug from the inner tubular member into the outer tubular member, and in which the plug comprises the stop member.

19. A table as claimed in claim 14 wherein said base provides stepping surfaces for a user to engage with the user's foot so that the user can hold said base against rotation on a user rotating the tabletop.

20. A tabletop as claimed in claim 19 wherein said base comprises a plurality of radially and outwardly extending legs defining said stepping surfaces.

21. A table as claimed in claim 20 wherein said base further comprises an annular base portion connected to an outer end of each of said legs, said annular base portion adapted to be engaged by a user's foot.

22. A table as claimed in claim 19 including a support for the tabletop fixedly coupled to the upper end of the column and supporting the tabletop thereon, the tabletop support providing surfaces for the user to hold onto so that the user can turn said tabletop support relative the base.

23. A table as claimed in claim 22 wherein said tabletop support comprises a plurality of radially and outwardly extending arms and includes an annular top portion connected to an outer end of each of said arm, said annular top portion defining a portion to be grasped by a user's hands for rotation of the table.

24. A table as claimed in claim 14 wherein said tabletop is circular.

* * * * *